United States Patent
Bürge et al.

[11] Patent Number: 5,916,483
[45] Date of Patent: Jun. 29, 1999

[54] ADDITIVE AND A PROCESS FOR INHIBITING THE CORROSION OF METALS IN CONSTRUCTION MATERIALS AND CONSTRUCTIONS MATERIALS CONTAINING SAID ADDITIVE

[75] Inventors: Theodor A. Bürge, Geroldswil; Urs Mäder, Frauenfeld, both of Switzerland

[73] Assignee: Sika AG, vorm, Kaspar Winkler & Co., Switzerland

[21] Appl. No.: 08/734,727

[22] Filed: Oct. 21, 1996

Related U.S. Application Data

[63] Continuation of application No. 08/277,093, Jul. 19, 1994, abandoned.

[30] Foreign Application Priority Data

Jul. 19, 1993 [CH] Switzerland .............. 2180/93

[51] Int. Cl.[6] .................. C09K 3/00; C04B 9/02; C04B 7/02; C04B 14/00
[52] U.S. Cl. .................. 252/390; 252/392; 106/14.24; 106/14.42; 106/14.44; 106/664; 106/808; 106/819; 106/823; 106/727
[58] Field of Search .................. 106/14.24, 14.42, 106/14.44, 664, 808, 819, 823, 727; 252/390, 392

[56] References Cited

U.S. PATENT DOCUMENTS

| | | | |
|---|---|---|---|
| 2,397,886 | 4/1946 | Scripture | 106/808 |
| 3,087,825 | 4/1963 | Meier-Grolman | 106/800 |
| 3,619,221 | 11/1971 | Kossivas | 106/727 |
| 3,686,220 | 8/1972 | Burke | 523/351 |
| 3,689,295 | 9/1972 | Hersey et al. | 106/723 |
| 3,822,998 | 7/1974 | Juchniewicz | 216/100 |
| 4,113,498 | 9/1978 | Rones et al. | 106/14.13 |
| 4,406,702 | 9/1983 | Joseph | 106/823 |
| 4,442,021 | 4/1984 | Bürge et al. | 106/728 |

(List continued on next page.)

FOREIGN PATENT DOCUMENTS

| | | |
|---|---|---|
| 1258473 | 3/1989 | Canada . |
| A0247773 | 12/1987 | European Pat. Off. . |
| 3141145 | 4/1983 | Germany . |
| 50-1120 | 1/1975 | Japan . |
| 60-215778 | 10/1985 | Japan . |

(List continued on next page.)

OTHER PUBLICATIONS

Grant & Hackh's Chemical Dictionary 4th edition, published 1987 by McGraw-Hill, Inc. (N.Y.), see p. 122.
WO 8706958 as abstracted by Chemical Abstracts (1987) 108: 99075.
Chemical Abstracts, vol. 115, No. 10, Sep. 9, 1991, Abstract No. 98048n.
Chemical Abstracts, vol. 82, No. 22, Jun. 2, 1975, Abstract No. 144281h.

*Primary Examiner*—C. H. Kelly
*Attorney, Agent, or Firm*—Burns, Doane, Swecker & Mathis, L.L.P.

[57] ABSTRACT

Additives are disclosed which inhibit the corrosion of metals in construction materials which contain an inorganic binder. The inventive corrosion inhibitors contain a reaction product of amines and acids or they consist of such a reaction product. Said saltlike corrosion inhibitors upon use do not develop any undesired fragrance, and they furthermore do not bring along any health risks for the persons who are working with said substances. Through the adding of the inventive corrosion inhibitors, furthermore the properties of the construction material during its preparation and also during its use can be improved. In corresponding processes for inhibiting the corrosion of metals which are in contact with the construction materials, like e.g. metal armings, the corrosion inhibitors are usually added in an amount of 0.01% by weight to 10% by weight of said reaction product, referred to the inorganic binder which is contained in such material. Construction materials which contain the inventive corrosion inhibitors provide a corrosion inhibition of any metal parts embedded into said construction materials over decades of years.

20 Claims, 2 Drawing Sheets

U.S. PATENT DOCUMENTS

| | | | |
|---|---|---|---|
| 4,466,834 | 8/1984 | Dodson et al. | 106/728 |
| 4,473,405 | 9/1984 | Gerber | 106/725 |
| 4,495,228 | 1/1985 | Cornwell | 427/385.5 |
| 4,619,702 | 10/1986 | Gartner | 106/736 |
| 4,626,283 | 12/1986 | Martins et al. | 106/14.24 |
| 4,892,586 | 1/1990 | Watanabe et al. | 106/727 |
| 5,009,962 | 4/1991 | Yamasoe | 106/14.13 |
| 5,071,579 | 12/1991 | Johnston et al. | 106/13 |
| 5,156,679 | 10/1992 | Gartner et al. | 106/808 |
| 5,262,089 | 11/1993 | Bobrowski et al. | 106/823 |
| 5,340,385 | 8/1994 | Arfaei et al. | 106/14.44 |
| 5,427,819 | 6/1995 | Weyers et al. | 427/136 |

FOREIGN PATENT DOCUMENTS

| | | |
|---|---|---|
| A 432334 | 9/1967 | Switzerland . |
| 601250 | 3/1978 | U.S.S.R. . |
| 765232 | 9/1980 | U.S.S.R. . |
| 1046220 | 10/1983 | U.S.S.R. . |
| 1051229 | 10/1983 | U.S.S.R. . |
| A2147296 | 6/1985 | United Kingdom . |
| WO8706958 | 11/1987 | WIPO . |

ADDITIVE AND A PROCESS FOR INHIBITING THE CORROSION OF METALS IN CONSTRUCTION MATERIALS AND CONSTRUCTIONS MATERIALS CONTAINING SAID ADDITIVE

This application is a continuation of application Ser. No. 08/277,093, filed Jul. 19, 1994 now abandoned.

BACKGROUND OF THE INVENTION

The present invention concerns additives for inhibiting or preventing the corrosion of metals in construction materials which comprise an inorganic binder, like cement, lime, hydraulic lime and gypsum, and optionally further constituents which are usually present in construction materials, like aggregates, materials which contain silicon dioxide and optionally further additives which improve the properties of the construction materials during their preparation and/or later on, when the construction materials are in use.

In many fields of the application, metals, like metal reinforcements, are embedded into construction materials. It furthermore been known since for many decades that inorganic binders which have basic properties, like cement and especially Portland cement, have the ability of protecting iron containing metals from the development of rust. Because of said rust protective effect of the inorganic binder, it was possible to use steel reinforced concretes in many fields of application. In said construction materials the steel reinforcements are embedded in the concrete and through the cement constituent of said concrete there is provided a durable corrosion resistance of the metal armings without applying onto it any protective coatings.

During the hydration of the cement, there is produced calcium hydroxide which raises a pH-value in the interior parts of the construction material to 12 or to a still higher value, and the corrosion protective activity of the cement is believed to be caused through said high pH-value.

In the corresponding construction materials during the use, however, by-and-by the carbon dioxide which is present in the environment converts the calcium hydroxide into calcium carbonate, and through said carbonate formation the pH-value in the construction material is lowered drastically. When the pH-value arrives at a value of 9 or lower, the corrosion of the steel arming embedded in the concrete starts and is proceeding by-and-by.

If during the use any cracks are formed in the construction material or if it comes into contact with chlorides then the corrosion of the embedded metal is accelerated. The contact of construction materials with chlorides or other metal corroding constituents can be caused through aggregates which contain any of said materials as impurities, through de-icing salts, through atmospheric pollution or through seawater.

In the prior art there, however, are not disclosed any additives which on one hand have the ability of preventing the corrosion of metals in construction materials during very long periods of time and with good reliability, and which on the other hand do not have a disadvantageous influence on any properties of the construction materials. Said problems are still more severe when the construction material is submitted to critical environmental influences, like e.g. brought into contact with chlorides or other corrosive agents.

DESCRIPTION OF THE PRIOR ART

Until now usually alkali nitrites and alkaline earth nitrites were used as corrosion inhibitors in construction materials which contain cement. For example, reference is made to the U.S. Pat. Nos. 3,210,207, 3,801,338, 3,976,494 and 4,365,999. The U.S. Pat. No. 4,092,109 proposes to use calcium nitrite as a corrosion inhibitor in metal reinforced concrete.

It, however, is well known in the art that nitrites and products which contain nitrites have a high toxicity and specifically the reaction products of nitrites are carcinogenic and because of this corresponding products have a very limited field of application. Furthermore, nitrites are water soluble and they maintain their water solubility also after their incorporation into construction materials, and therefore the concentration of the nitrites in the construction material decreases due to the elution of the nitrites through the water of the environment which contacts the construction material. Furthermore, nitrites have to be incorporated in rather high amounts because they are used up when they exert their passivating action onto the metal parts. According to the classification of the National Association of Corrosion Engineers (NACE) nitrites belong to the group of inhibitors which act merely anodically.

In Chemical Abstracts, vol. 115, no. 9, Sep. 2, 1991, Columbus, Ohio, US, page 360, abstract no. 98048n, there are described superplasticizers for concrete mixtures. The corresponding superplasticizers have to comprise four different components, i.e. aluminum complexes of hydroxy-carboxylic acids in the form of their alkali metal salts, a mono-, di- and/or triethanolamine, an alkali metal ortho-phosphate and furthermore an alkali metal sulfate. It is stated that through the incorporation of said superplasticizers into the concrete mixture, the compressive strength of the concrete, its water-proofness and its freeze resistance can be increased and that furthermore the corrosion of reinforcing rods can be prevented through the incorporation of said superplasticizer. Three of the totally four components of said superplasticers, however, comprise alkali metal ions, and it is well known that the incorporation of alkali metals into a cement matrix should be avoided due to their negative influence onto the cement matrix of the construction materials.

In the U.K. patent application 2,147,296 there are described amine salts which are useful in cement compositions comprising hydraulic cement, and the corresponding amine salts are the reaction products of an amine with such a mixture of aromatic carboxylic acids, which is obtained as a by-product in a process for the synthesis of phthalic anhydride (see claim 1). The corresponding amine salts are used as grinding aids during the grinding process of hydraulic cement, and through the addition of said salts the surfaces which are freshly exposed through the grinding process are covered with said amine salts of the mixture of aromatic acids, and thereby a compaction of the ground particles is prevented. The corresponding salts of the aromatic acids have toxic properties and through the incorporation of said products into the cement matrix a disposal of said undesired by-products is avoided. Due to their toxicity and because of the fact that the corresponding products are added for improving the grinding procedure they are incorporated only in low dosages, and usually only 0.001 to 1% by weight of the corresponding salts of the aromatic acids are added, based on the weight of cement. No reference can be seen from said publication that construction materials which contain cement which had been prepared using said grinding aid exhibit any advantageous properties over construction materials which contain cement prepared without the use of said grinding aids.

Swiss patent 432,334 concerns a process for the preparation of a mortar in which the inorganic binder is calcium sulfate. In said process there is added a set retardening agent and furthermore a hydrophobic component which covers the surface of the calcium sulfate particles and thereby retards the crystallization thereof after the water had been added during said process. The corresponding hydrophobing agents are preferably paraffinic hydrocarbons or surfactants of the cationic type, like fatty amines having long aliphatic chains. Optionally further components can be added during said process, like dispersants, gel forming agents, corrosion inhibitors, colors, fungicides and antiseptic components. As corrosion inhibitors there are mentioned N-polyglycol-derivatives of primary amines and secondary polyamines which have in their structure aliphatic chains of 8–22 carbon atoms (see e.g. claim 8). No reference can be found in said patent that any reaction products or salts of amines could be used as corrosion inhibitors.

In Chemical Abstracts, vol. 82, no. 22, Jun. 2, 1975, Columbus, Ohio, US, page 283, abstract no. 144281h, there are described corrosion inhibitors for mortars and concrete. The corresponding corrosion inhibitors are mixtures which consist of 50–90 parts by weight of nitrites, 8–20 parts by weight of inorganic phosphates, 1–15 parts by weight of aldonic acids or salts thereof, and 1–15 parts by weight of diethanol amine. Specifically, there is described a corresponding mixture of sodium nitrite, sodium hexametaphosphate, sodium aldonate and triethanol amine. Accordingly, with said corrosion inhibitors neither the health risks which are caused through nitrites are avoided nor the undesired incorporation of sodium ions into the concrete matrix.

In European patent application 247,773 there is described a method for treating already cured reinforced concrete structures by inserting into cracks of bore holes of said cured construction material, like e.g. a building, such corrosion inhibitors which have the ability of migrating through the porous structure of the concrete, especially along the interphase, where the reinforcement contacts the concrete. It is clearly evident from said publication that the inhibitor has to migrate in the vapor phase of the cured concrete matrix and that the corrosion inhibitor which is usually carried by a body of a carrier material, is only suited for the repair of long existing concrete structures, like buildings.

In the U.S. Pat. No. 4,726,914 there is disclosed that a mixture of an alkanolamine with a polyol comprising three or four hydroxy groups per molecule can be used for inhibiting the corrosion of steel. In column 3, lines 1–4 of said patent it is emphasized that no corrosion inhibition was achieved if only the alkanolamine, i.e. triethanolamine was used. Furthermore, in said patent only the corrosion inhibition of steel, however, not of any steel reinforcement which is embedded in a construction material was investigated.

In Canadian patent 1,258,473 there is described a process for inhibiting the corrosion of iron and steel in corresponding reinforced concrete by adding a water soluble hydroxyalkylamine. The corresponding hydroxyalkylamines are preferably the only substance of the used corrosion inhibitor, and preferably the corresponding materials are mixible with water in any ratio (see page 6, lines 7–9, respectively the last but one and last line of page 6).

In said Canadian patent no reference can be found that to the concrete there could be also added instead of the hydroxyalkylamines described in said patent, a salt of a corresponding hydroxyalkylamine.

It is the aim of the present invention to provide new additives for inhibiting the corrosion of metals in construction materials through which additives the corrosion of metals which are embedded in corresponding construction materials containing inorganic binders can be prevented during very long periods. It was surprisingly found out that said aims can be achieved through new corrosion inhibitors which contain the reaction product of amines with acids or which consist of such reaction products.

DESCRIPTION OF THE INVENTION

Figure 1:
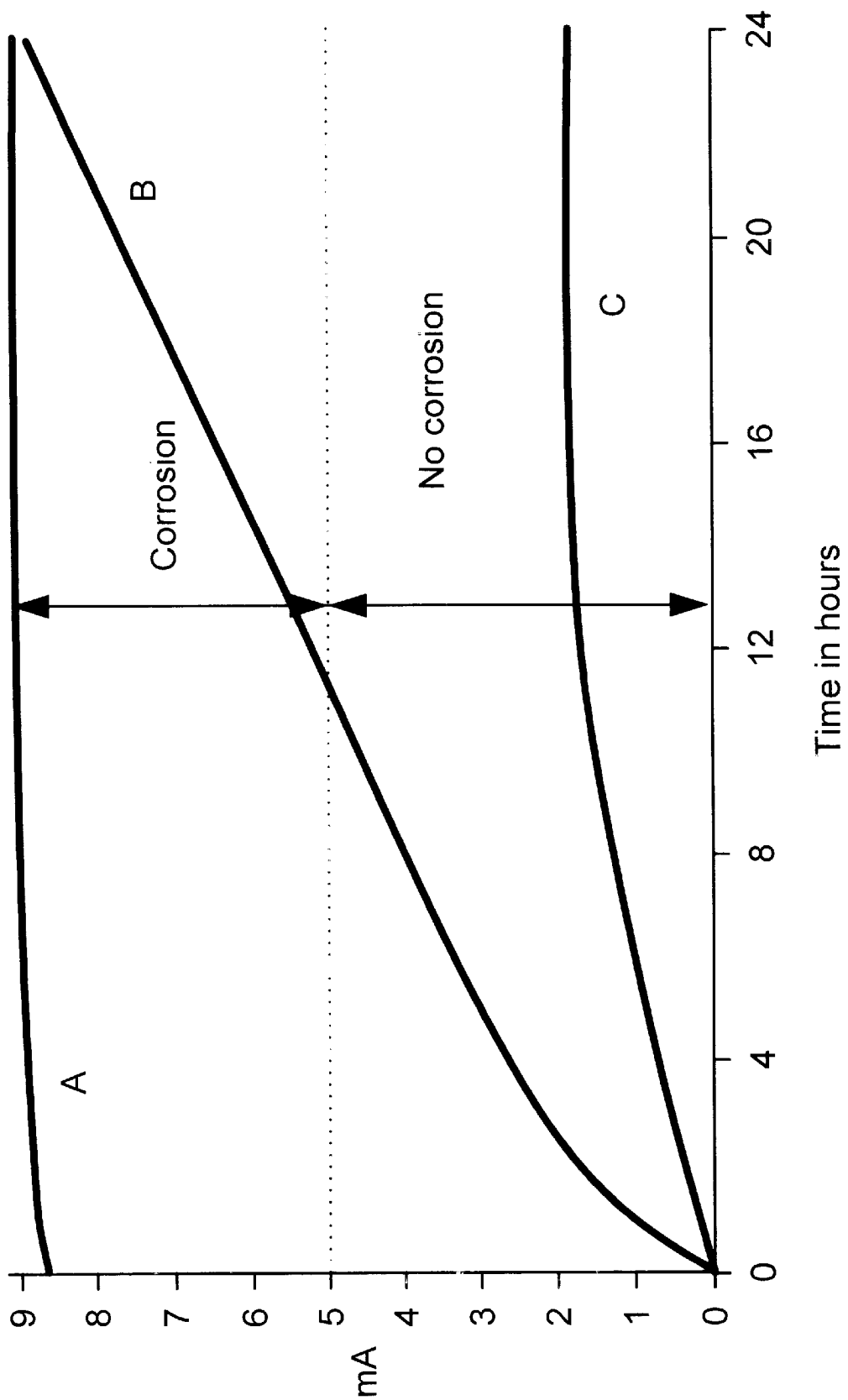
FIG. 1 is a graph of current versus time, illustrating potentiostatic loading characteristics of various concrete formulations according to Example 1.

One object of the present invention is an additive for inhibiting the corrosion of metals in construction materials which contain inorganic binders, which is characterized in that said corrosion inhibitor contains a reaction product of amines with acids or that it consists of said reaction product.

An essential advantage of the corrosion inhibitors which are present in the inventive additives is, that the corresponding corrosion inhibitors are anodically acting and further cathodically acting corrosion inhibitors. Through the corresponding corrosion inhibitors the dissolving of the metal at the anode is prevented or retarded through the formation of compounds which are insoluble in water or have only a very low solubility in water. Furthermore, also the metal is protected at the cathode through the formation of a monomolecular layer of the inhibitor, which prevents a direct contact of any corrosive media with the metal.

A further advantage of the corrosion inhibitors which are to be used according to the present invention resides in the fact, that the corresponding reaction products of amines and acids are salt like compounds which are not volatile or have a very low volatily so that they do not escape to the surrounding air when they are used.

Furthermore, the corrosion inhibitors based on alcanolamines which are described in the Canadian patent 1 258 473 mentioned before have the disadvantage that they belong to the class of the inhibitors which are only acting cathodically. Furthermore, the alkanolamines described in said patent, specifically those which have a vapor pressure in the upper region of the stated ranges, have an unpleasent fragrance and this is rather unwelcome for all persons using such products. Some of the alkanolamines described in said prior art, furthermore, have a deteriorating effect on the construction materials, especially corresponding concretes, and furthermore the alkanolamines have the tendency of escaping by-and-by from the construction material. Therefore, the period of time during which in the construction material, for example in a concrete building, the corrosion inhibition of the metal reinforcement is provided, is rather limited.

A further object of the present invention is a process for inhibiting the corrosion of metals in construction materials, said metals being in contact with inorganic binders which are present in said construction materials, and wherein said process is characterized in that during the preparation of the construction material there is added an inventive additive in such a quantity that the corrosion inhibitor which is a reaction product of amines and acids is present in an amount of 0.01 to 10% by weight, referred to the weight of the inorganic binder.

According to a preferred embodiment of said process the inventive additive is added in such a quantity, that the corresponding corrosion inhibitor is present in an amount of 0.05 to 5% by weight, preferably 0.1 to 3% by weight, and specially preferred 1 to 3% by weight, referred to the weight of the inorganic binder.

According to the stated process it is possible to add the additive for preventing the corrosion as a premix with the inorganic binder or as a premix with the aggregate, and optionally also a premix of corrosion inhibitor, inorganic binder and aggregate can be used.

According to a further embodiment of the process, the inventive additive which is a corrosion inhibitor or comprises the corrosion inhibitor, can be added as separate component during the introduction of the water or mixed with the water or, according to an alternative performance, after the water had already been added to the construction material.

If the inventive corrosion inhibitor is intended to be used for the preparation of such construction materials in which the inorganic binder is cement, then the inventive corrosion inhibitor can be added to the cement, for instance Portland cement, either before the grinding or after the grinding of the cement clinkers.

The inventive additives exhibit their advantageous properties, however not only in concrete but also in such construction materials which contain as inorganic binder lime, hydraulic lime or gypsum.

In as far as the preparation of concrete is concerned the inventive additives can be used for preparing very different qualities of concrete, like e.g. in a process for preparing light-weight concrete, concrete, dense concrete, aerated concrete or porous concrete.

A further object of the present invention is a construction material which contains an inorganic binder and furthermore an additive for inhibiting the corrosion of metal in said construction material, and said construction material is characterized in that it contains as corrosion inhibitor an inventive additive, and wherein in said construction material the corrosion inhibitor on the basis of a reaction product of amines and acids is present in an amount in the range of 0.01% by weight to 10% by weight, referred to the weight of the inorganic binder which is contained in the construction material.

According to a preferred embodiment of said inventive construction material, the metals which are embedded into said construction materials are metal reinforcements.

Preferably the construction material contains the inventive additive in such a quantity that the corrosion inhibiting reaction product of amines with acids is present in the finally cured construction material in an amount of 0.05% by weight to 5% by weight, preferably in an amount of 0.1% by weight to 3% by weight, and still more preferred, an amount of 1% by weight to 3% by weight, referred to the weight of the binding agent which is present in said cured construction material.

In preferred inventive additives the amine component of the corrosion inhibitor is selected from the group consisting of primary amines, secondary amines and tertiary amines and mixtures thereof, and said amines comprise one amino group, two amino groups or a plurality of amino groups, and furthermore said amino groups of the amino component comprise a nitrogen atom to which there are bonded one, two or three residues which are selected from the group consisting of hydrogen atoms, unsubstituted aliphatic residues, substituted aliphatic residues, unsubstituted aromatic residues, substituted aromatic residues, unsubstituted cycloaliphatic residues, substituted cycloaliphatic residues and combinations of different residues selected from the above stated group, provided that however to the nitrogen atom there has to be bonded at least one residue which is not a hydrogen atom, or in which amino component of the corrosion inhibitor at least one amino nitrogen atom is a part of a heterocyclic structure which comprises in its heterocyclic nucleus at least one nitrogen atom.

Preferred amino components of the inventive additive comprise in their molecule at least one hydroxy group.

Preferred of the above stated amino components which comprise in their molecule at least one hydroxy group, are selected from the group consisting of such primary, secondary and tertiary aliphatic amines which contain in their molecule at least one alkanol-amine group.

Special examples of amino components of the inventive corrosion inhibitors comprise at least one amine which is selected from the group which consists of the following amines:

cyclohexylamine,
dicyclohexylamine,
N-methyl-cyclohexylamine,
N,N-dimethyl-cyclohexylamine,
N-benzyl-dimethylamine,
hexylmethylene-tetramine,
triethyl-tetramine,
diethylene-triamine,
ethylene-diamine,
N,N-dimethyl-ethanolamine,
N-methyl-diethanolamine,
mono-, di-, tri-ethanolamine,
piperazine,
morpholine,
guanidine as well as derivatives of the above stated amines.

The acid component of the corrosion inhibitor is preferably selected from the group consisting of monobasic inorganic acids, dibasic inorganic acids, polybasic inorganic acids, monobasic organic acids, dibasic organic acids, polybasic organic acids and mixtures comprising two or more of said acids.

In the inventive additive the corrosion inhibitors based on the reaction products of amines and acids can be complete reaction products of amines and acids or incomplete reaction products of amines and acids. Furthermore, the amine componente can comprise per molecule one, two or several amino groups and also the acid component of said reaction products can be, as already explained above, a monobasic, a dibasic or a polybasic acid. Furthermore, in the inventive corrosion inhibitors the molar ratio between the amine component and the acid component can be a stoichiometric ratio, referred to the basic groups and the acidic groups respectively, or optionally there can be present an excess of the amino component over the stoichiometric amount which would be necessary in order to neutralize all acidic groups of the acid component.

Preferred acid components of the corrosion inhibitors are selected from the group of acids which consist of such acids which themselves have a corrosion inhibiting activity, a water reducing activity, a high-range water reducing activity or a corrosion inhibiting as well as a water reducing activity.

According to a further preferred embodiment of the invention, the acid component of the corrosion inhibitor is selected from the group consisting of acids which have the ability to form with calcium ions complexes or chelates or to form with calcium ions compounds having a low solubility or being nearly insoluble in water and calcium complexes or chelates which have a low solubility in water or are nearly insoluble in water.

Specially preferred acid components of the corrosion inhibitors are selected from the group consisting of the following monobasic or polybasic inorganic or organic acids:

nitric acid,
sulfuric acid,
phosphoric acid,
pyrophosphoric acid,
phosphonic acid,
benzoic acid,
aminobenzoic acid,
sulfanilic acid,
salicylic acid,
sebacic acid,
oleic acid,
linoleic acid,
adipic acid,
tetrahydroxy-adipic acid,
lactic acid,
tartaric acid,
citric acid,
gluconic acid,
heptonic acid and
ascorbic acid.

It was surprisingly found out that through the inventive corrosion inhibitors the properties of the construction materials in the procedure of their preparation and/or the properties of the finally cured construction materials can be controlled in the desired way and adapted so that they are specially suited for the desired fields of application of the corresponding construction materials.

For instance it is possible to achieve through the inventive corrosion inhibitor a rapid curing and an accelerated gaining of a high rigidity or strength of prefabricated construction materials. Through the incorporation of the inventive corrosion inhibitors, the construction materials can be worked at lower temperatures than the temperatures at which corresponding construction materials, into which no inventive corrosion inhibitors had been incorporated, are workable. In as far as concrete supplied by a concrete ready mix plant is concerned it is possible to prolong the period during which said concrete is workable through the adding of the inventive corrosion inhibitors and/or to prevent the starting of the curing, respectively a premature curing, if the mixture is submitted to higher temperatures.

According to a further embodiment of the present invention, the inventive additive contains furthermore a solid carrier material or a liquid carrier material or a mixture thereof and the corrosion inhibitor can be dissolved in the liquid carrier material, dispersed in the liquid carrier material, dissolved and dispersed in the liquid carrier material, absorbed on the solid carrier material or mixed with the solid carrier material.

Preferably the liquid carrier material is selected from the group consisting of water, aqueous solutions or aqueous dispersion of inorganic particles, aqueous solutions and aqueous dispersions of organic particles, and the solid carrier materials are preferably selected from the group consisting of inorganic binders and solid constituents of construction materials or mixtures thereof.

Accordingly, the inventive additive can comprise a corrosion inhibitor and furthermore a solid carrier material which is selected from the group consisting of inorganic binders and inorganic solid materials and mixtures thereof. Said inorganic binders and inorganic solid materials are preferably selected from the group consisting of cement, lime, lime stone, hydraulic lime, gypsum, plaster of Paris, fly ash, blast-furnace-slag, puzzolanes, finely divided silica, preferably silica fume, burnt oil shale, metakaolin, sand and mixtures comprising two or more of the above stated solid carrier materials.

According to a further embodiment of the present invention, the additive contains the corrosion inhibitor and a further component which has the ability to alter or improve the properties of a construction material which contains an inorganic binder during the process of its preparation or during the use of said construction material.

Preferred such further components which can be present in the inventive additive and which improve or alter the properties of the construction material during its preparation or use are selected from the group consisting of set-accelerators, set-retarders, water-reducers (also called plasticizers), high-range water-reducers (also called super-plasticizers), air-entraining agents, waterproofing agents and mixtures comprising two or more of said above mentioned further components.

With regard to the corrosion inhibitors of the present invention which are reaction products of amines and acids it is very advantageous that some of the preferred acid components of said corrosion inhibitors, specially those which are selected from the group comprising dicarboxylic acids and hydroxycarboxylic acids have themselves the ability to act as water reducers, which are also called concrete plasticizers. Because of this it is possible to reduce the quantity of water when the mixture is prepared, if the inventive corrosion inhibitor is added, and at said lower water to cement ratios the workability of the concrete mixture is as good as it is to be observed with such concrete mixtures which do not contain the inventive corrosion inhibitor and which have a far higher water to cement ratio than the mixtures which contain the inventive corrosion inhibitors. A low water to cement ratio is specially advantageous because through such a low water content of the mixture the finally cured concrete has a very dense matrix of the binding agent.

A very dense matrix of the binding agent is of outstanding importance if the corrosion of metals, for instance metal reinforcements, has to be prevented, which metals are in contact with construction materials. Through an extremely dense matrix of the binder the rate of diffusion of corrosive materials in the construction materials is reduced, for instance the migration of chlorides. Therefore, it is advantageous to add in addition to the inventive corrosion inhibitor during the preparation of the construction materials further components which result in the development of a dense matrix of the binder. Such additives which have a densifying effect are e.g. water reducing agents, high range water reducing agents as well as inorganic silicon containing additives which had already been used for a long time in order to achieve the development of a dense matrix of the inorganic binder. Special examples of such densifying silicon dioxide containing additives are fly ash, blast-furnace-slags, silica fume and similar products.

When the inventive process for inhibiting the corrosion of metals in construction materials is performed then the corresponding metals can be optionally in contact with other constituents which may be present in the construction material, and said constituents are selected from the group consisting of aggregates and further silicon-dioxide containing materials.

The corresponding process is preferably performed by adding the specially preferred inventive additives described above.

When the inventive process is performed then the additive for preventing the corrosion can be added in the form of a mixture which comprises said corrosion inhibitor and the binder or as mixture which comprises the corrosion inhibitor, a binder, and furthermore the aggregate. The inventive additive, however, can also be added during the preparation of the construction material at the time the water is added or after the water had been added.

If said process is performed for preparing such a construction material which comprises an inorganic binder being cement, then the corrosion inhibitor can be added before or after the grinding of the cement clinkers.

The inventive process for inhibiting the corrosion of metals in construction materials is applicable to a wide variety of different construction materials. Accordingly, the additive for inhibiting the corrosion can be added in a procedure for preparing light-weight concrete, concrete, dense concrete, aerated concrete or porous concrete.

The present invention is now further illustrated through the following non limitative examples.

EXAMPLE 1

Regulation of the Properties of the Concrete

Prefabricated construction materials are made and due to the incorporation of the inventive corrosion inhibitors the curing is accelerated. The tests were performed using standard concrete according to the specification SIA 215 and in said example furthermore 1% by weight, referred to the weight of the cement of the superplasticizer Sikament was added.

In said example the amine component of the corrosion inhibitor was NN-dimethyl-ethanol amine and the acid indicated in the following table in each example was added until the mixture of amine and acid had reached a pH value of 8.2.

In the example for comparison only 3% of the amine was added, referred to the weight of the cement. In the following example the reaction product of the amine and the stated acid was added, and said reaction product was added in such an amount that 3% by weight of the amine component, referred to the weight of the cement, were added.

TABLE I

| Acid component of the product of amine and acid | Workability time in hours | Compressive strength in N/mm$^2$ after a curing time of | |
|---|---|---|---|
| | | 1 day | 28 days |
| control (only amine) | 3.5 | 22.6 | 60.1 |
| nitric acid 65% | 2.5 | 26.6 | 63.0 |
| sulfuric acid 96% | 3 | 23.3 | 62.1 |
| lactic acid 90% | 2.5 | 24.0 | 67.7 |
| mixture of benzoic acid and lactic acid in a ratio of 1:3 | 2 | 26.1 | 69.0 |

EXAMPLE 2

Regulation of the Properties of Concrete

In this test the concrete produced in a concrete ready-mix plant was tested. The corresponding ready-mix concrete was again standard concrete according to the specification SIA 215, and it contained 1%, referred to the cement of the superplasticizer Sikament.

The amine component of the inventive reaction product was NN-dimethyl-ethanol amine, and the additive was added in an amount of 3% by weight, of the amine component, referred to the weight of cement present in the concrete. In the example of comparison only the amine was added. In the inventive example there was added the amine which prior had been neutralized partially through the addition of the acids stated in the following table until the reaction product of the NN-dimethyl-ethanol amine and the corresponding acid had reached a pH value of 8.2.

TABLE II

| Acid component | Workability time in hours | Compressive strength N/mm$^2$ after | |
|---|---|---|---|
| | | 1 day | 28 days |
| control (only amine) | 3.5 | 22.6 | 60.1 |
| phenylphosphonic acid | 4 | 18.3 | 52.5 |
| propionic acid | 4 | 17.2 | 63.1 |
| sulfamic acid | 4 | 18.7 | 63.9 |
| benzoic acid | 4.5 | 16.6 | 57.1 |
| ortho phosphoric acid | 11 | 1.7 | 64.6 |
| tartaric acid | 18 | 2.3 | 64.4 |
| gluconic acid | 29 | — | 67.9 |

It can be seen from said example that through the incorporation of the inventive additives, specially those in which the acid component was ortho phosphoric acid, tartaric acid or gluconic acid, the time within which the ready-made concrete could be used was drastically prolonged if compared with the corresponding concrete which contained instead of the inventive additive only the amine component of said additive.

EXAMPLE 3

In this example the potentiostatic loading at a concrete electrode was tested.

The tested concrete had a water to cement ratio of 0.5. It contained aggregates of 0–6 mm, and as corrosive material 3% of calcium chloride, referred to the weight of cement, was added.

In the test where the inventive corrosion inhibitor was added, it was added in an amount of 2% by weight, referred to the weight of the cement.

A steel electrode which had a length of 10.5 cm and a width of 0.7 cm was degreased and polished. The concrete sample had a prismatic shape of 4×4×16 cm, and the polished steel electrode was introduced into the center of said concrete prism according to the method SIA 215.

The potentiostatic determinations were performed using the usual method of applying three different electrodes, i.e. the concrete electrode, the auxiliary electrode which had a layer of platine on its surface, and a reference electrode (SCE) which was immersed in a 5% solution of NaCl.

The test was performed during 24 hours and the applied voltage was maintained constant with regard to the reference SCE electrode at −200 mV. The flow of current was determined, and the results of said tests are given in the enclosed FIG. 1.

In said figure the current is plotted in mA, and the time in hours. The curve indicated with A indicates the results obtained with the prisms of concrete which did not contain any corrosion inhibitor.

The results indicated through curve B were obtained with corresponding concrete prisms which contained as corrosion inhibitor a plastic material, i.e. 8% of SBR-latex, referred to the weight of the cement.

The results which are illustrated through curve C were obtained with the corresponding samples of concrete which contained 2% by weight of an inventive corrosion inhibitor, referred to the weight of the cement. In the present example as inventive corrosion inhibitor there was used dicyclohexyl-ammoniumnitrate, and it can be clearly seen that in the test illustrated through the curves C no corrosion at all was observed, even after 24 hours. Contrary to this, in the concrete samples where the additive was an SBR latex, already after 12 hours of test the corrosion of the steel electrode began.

EXAMPLE 4

In said example the galvanodynamic polarization was determined.

Figure 2:
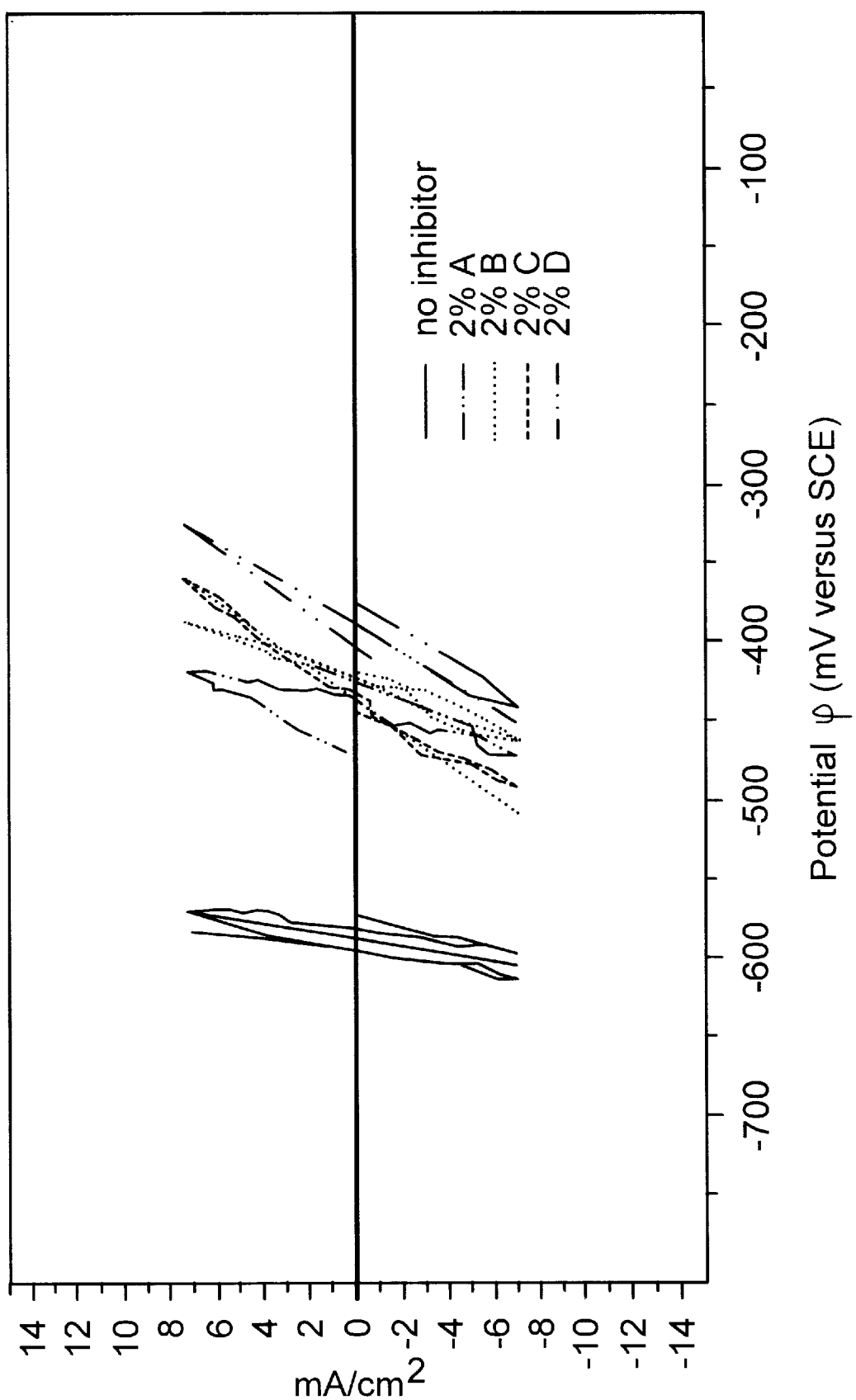
FIG. 2 is a graph of current density versus potential, illustrating galvanodynamic polarization characteristics of various concrete formulations according to Example 4.

The results of said tests are illustrated through FIG. 2. In said FIG. 2 there is plotted the current density in mA per $cm^2$, and furthermore the potential in mV referred to the reference electrode SCE.

In said example the current density versus the potential is plotted which is caused through the galvano dynamic polarization in the reagion near to the equilibrium rest potential.

In said test, media were examined which contained 2% by weight of the inhibitors A, B, C and D respectively. Said media furthermore contained 0.09 mols/l of sodium chloride and to said media 1.5 ml of a 0.5 molar KOH solution had been added. The corresponding tests were performed using an electrometric cell and a three-electrode-equipment was used. Said equipment comprised a steel electrode (St37), as operation electrode, a saturated calomel electrode as a reference electrode (SCE), and said reference electrode was furthermore equipped with a Luggin capillary, and as third electrode, i.e. as counter electrode there was used a platin electrode.

The measurements of the currrent density versus the potential was performed using a corresponding equipment (CAMEC II station) of the MPWS-company, and through said equipment the regulation and the registration was performed.

The curve which is drawn in FIG. 2 as solid lines was obtained with the sample where no corrosion inhibitors had been added. The curves in which the lines are indicated with A, B, C and D in said FIG. 2, were obtained with samples to which 2% by weight of four different inventive corrosion inhibitors had been added. Said corrosion inhibitors were:

A) benzylammoniumbenzoate
B) benzylammoniumbenzoate+morpholine
C) benzylammoniumbenzoate+diethylene-triamine
D) methylcyclohexylammoniumbenzoate.

EXAMPLE 5

According to the present example a concrete having a reduced absorbance of water was prepared, i.e. a water dense concrete according to the regulations of DIN 1048. The concrete was made of the following constituents:

300 kg of Portland cement per $m^2$, applying a water to cement ratio of 0.50
sand: 32% sand of 0/4 were added,
aggregate: as aggregate 68% gravel, i.e. gravel 4/8 was used.

In said example the inventive inhibitor E was tested, i.e. N,N-methyl-diethanol-amine-gluconate and said inhibitor was added in an amount of 3% per weight, referred to the weight of the cement.

Through the addition of said inhibitor it was possible to reduce the quantity of water which was necessary to prepare the concrete.

In the following table the dosage of the inhibitor, stated in %, the water reduction, stated in % and the penetration stated in cm are given.

In the test for comparison no corrosion inhibitor was added:

TABLE III

|  | dosage in % | Water reduc-. tion in % | penetration |
| --- | --- | --- | --- |
| test of comparison | none | none | 16 cm |
| inhibitor E | 0.2 | 3.2 | 8.1 cm |
| inhibitor E | 0.4 | 4.7 | 6.8 cm |
| inhibitor E | 1 | 8.2 | 4.5 cm |

EXAMPLE 6

According to said example a concrete of high density was prepared. The water reduction and the porosity of the capillars of the concrete were determined.

The tested concrete was made, using the following constituents:

300 kg of Portland cement per $m^2$, maintaining a water to cement ratio of 0.50.
sand: 32% of sand o/4
aggregate: 68% of gravel 4/8.

The used inhibitor was 0.5% of the reaction product of N,N-dimethylethanolamine and benzoic acid referred to the weight of cement. The superplasticizer used in said example was a melamine polycondensation product. The porosity of the capillars of the concrete was determined according to the method SIA 162/1. In said test 5 cylinders were drilled out of the cured concrete, and said cylinders, which had a height of 50 mm and diameter of 50 mm, were tested.

TABLE IV

| type of concrete | O-concrete | 1% superplasticizer ref. to the weight of cement | 1.5% superplasticizer + 8.5% silica fume ref. to the weight of cement |
| --- | --- | --- | --- |
| water reduction | none | 13.2% | 14.6% |
| porosity of the capillars in % | 100% | 80.2% | 66.3% |

Furthermore, with the corresponding test specimens the resistance to frost was determined by determining the water absorption of the specimens, and thereby the critical saturation and the maximum saturation was determined.

Furthermore, the volume of those pores was determined which are not filled with water through immersion of the samples into water (through the water absorbancey of the pores). Said volume of not filled pores was compared with the free volume of pores at the critical water content.

We claim:

1. An additive for inhibiting the corrosion of metals in a construction material containing an inorganic binder, wherein said additive is in admixture with said inorganic binder and comprises a reaction product of an amine and an acid, wherein said reaction product is at least a partially neutralized salt, and said acid is selected from the group consisting of nitric acid, sulfuric acid, phosphoric acid, pyrophosphoric acid, phosphonic acid, benzoic acid, aminobenzoic acid, sulfanilic acid, salicylic acid, sebacic acid, oleic acid, linoleic acid, adipic acid, tetrahydroxy-adipic acid, lactic acid, tartaric acid, citric acid, gluconic acid, heptonic acid and ascorbic acid.

2. An additive according to claim 1, wherein:

the amine component of the additive is selected from the group consisting of primary amines, secondary amines, tertiary amines, and mixtures thereof, and wherein said amines comprise one or more amino groups, and wherein said amino groups of the amine component comprise a nitrogen atom to which there is bonded one, two or three residues selected from the group consisting of hydrogen atoms, unsubstituted aliphatic residues, substituted aliphatic residues, unsubstituted aromatic residues, substituted aromatic residues, unsubstituted cycloaliphatic residues, substituted cycloaliphatic residues and combinations of different residues selected from the above stated group;

or, in the amine component of the additive, at least one amino nitrogen atom is a part of a heterocyclic structure which comprises in its heterocyclic nucleus at least one nitrogen atom.

3. An additive according to claim 1, wherein the amine component of the additive comprises in its molecule at least one hydroxy group.

4. An additive according to claim 3, wherein the amine component which comprises in its molecule at least one hydroxy group is selected from the group consisting of primary, secondary, and tertiary aliphatic amines which contain in their molecule at least one alkanol amine group.

5. An additive according to claim 1, wherein the amine component of the additive comprises at least one amine selected from the group consisting of cyclohexylamine, dicyclohexylamine, N-methyl-cyclohexylamine, N,N-dimethyl-cyclohexylamine, N-benzyl-dimethylamine, hexylmethylene-tetramine, triethyl-tetramine, diethylene-triamine, ethylene-diamine, N,N-dimethyl-ethanolamine, N-methyl-diethanolamine, mono-ethanolamine, di-ethanolamine, tri-ethanolamine, piperazine, morpholine, guanidine, and derivatives thereof.

6. An additive according to claim 1, wherein the reaction product of the additive has a stoichiometric ratio of the amine and acid components or an excess of the amine component over the acid component.

7. An additive according to claim 1, wherein the acid component of the additive is selected from the group consisting of sulfuric acid, phosphoric acid, pyrophosphoric acid, phosphonic acid, benzoic acid, aminobenzoic acid, sulfanilic acid, salicylic acid, sebacic acid, oleic acid, linoleic acid, adipic acid, tetrahydroxy-adipic acid, lactic acid, tartaric acid, citric acid, gluconic acid, heptonic acid and ascorbic acid.

8. An additive according to claim 1, further comprising a solid carrier material, a liquid carrier material, or a mixture thereof, wherein the additive is dissolved in the liquid carrier material, dispersed in the liquid carrier material, dissolved and dispersed in the liquid carrier material, absorbed on the solid carrier material or mixed with the solid carrier material.

9. An additive according to claim 8, wherein the additive comprises a solid carrier material selected from the group consisting of inorganic binders, inorganic solid materials, and mixtures thereof, and wherein said inorganic binders and inorganic solid materials are selected from the group consisting of cement, lime, lime stone, hydraulic lime, gypsum, plaster of Paris, fly ash, blast-furnace-slag, puzzolanes, finely divided silica, silica fume, burnt oil shale, metakaolin, and mixtures thereof.

10. An additive according to claim 8, wherein the additive comprises sand.

11. An additive according to claim 8, wherein the liquid carrier material is selected from the group consisting of water, aqueous solutions of inorganic particles, aqueous dispersions of inorganic particles, aqueous solutions of organic particles, and aqueous dispersions of organic particles, and wherein the solid carrier materials are selected from the group consisting of inorganic binders, solid constituents of construction material, and mixtures thereof.

12. An additive according to claim 1, further comprising a component selected from the group consisting of set-accelerators, set-retarders, water-reducers, high-range water-reducers, air-entraining agents, waterproofing agents, and mixtures thereof.

13. A process for inhibiting the corrosion of metal in a metal reinforced construction material comprising an inorganic binder, said process comprising (i) mixing the additive according to claim 1 with said construction material in an amount of 0.01 to 10% by weight, based on the weight of the inorganic binder present in the construction material, and (ii) contacting the inorganic binder-containing construction material with the metal.

14. A process according to claim 13, wherein the metal is in contact with aggregates in the construction material or silicon-dioxide containing materials in the construction materials.

15. A process according to claim 13, wherein the additive for preventing the corrosion is added in the form of a mixture comprising said additive and the binder, or as a mixture comprising said additive, the binder and an aggregate, or wherein the additive is added during preparation of the construction material at the time or after water is added.

16. A process according to claim 15, wherein the additive is added to a construction material comprising a cement inorganic binder, wherein the cement has been prepared by grinding cement clinkers and the additive is added before or after the grinding of the cement clinkers.

17. A process according to claim 13, wherein the additive for inhibiting the corrosion is added during a procedure for preparing a concrete.

18. A process according to claim 17, wherein the concrete is selected from the group consisting of light-weight concrete, dense concrete, aerated concrete and porous concrete.

19. A construction material comprising an inorganic binder and an additive according to claim 1 for inhibiting the corrosion of metals in said construction material, wherein in said construction material the additive is present in the range of 0.01 by weight to 10% by weight, based on the weight of the reaction product of an amine and an acid relative to the weight of the inorganic binder in the construction material.

20. A construction material as claimed in claim 19, wherein the metal in the construction material is a metal reinforcement.

* * * * *